(12) United States Patent
Klingelhöfer et al.

(10) Patent No.: US 8,742,884 B2
(45) Date of Patent: Jun. 3, 2014

(54) SENSOR SYSTEM FOR PLANT MONITORING

(75) Inventors: Christian Klingelhöfer, Freiburg (DE); Felix Dreher, Bad Krozingen (DE)

(73) Assignee: Sick AG, Waldkirch (DE)

( * ) Notice: Subject to any disclaimer, the term of this patent is extended or adjusted under 35 U.S.C. 154(b) by 247 days.

(21) Appl. No.: 13/187,994

(22) Filed: Jul. 21, 2011

(65) Prior Publication Data

US 2012/0019350 A1    Jan. 26, 2012

(30) Foreign Application Priority Data

Jul. 22, 2010    (DE) .................... 20 2010 008 137 U

(51) Int. Cl.
*G05B 23/02* (2006.01)

(52) U.S. Cl.
USPC ............ 340/3.1; 340/555; 340/556; 340/557; 250/300

(58) Field of Classification Search
USPC .................................................. 340/555–557
See application file for complete search history.

(56) References Cited

U.S. PATENT DOCUMENTS

| | | | | |
|---|---|---|---|---|
| 6,414,747 | B1 * | 7/2002 | Hardy ............................. | 356/28 |
| 7,805,209 | B2 * | 9/2010 | Bechtel et al. .................. | 700/79 |
| 2002/0190191 | A1 | 12/2002 | Maurin et al. | |
| 2003/0141975 | A1 * | 7/2003 | Hama et al. .................... | 340/556 |
| 2009/0295577 | A1 * | 12/2009 | Yamaguchi .................... | 340/541 |

FOREIGN PATENT DOCUMENTS

| | | |
|---|---|---|
| DE | 202 09 187 U1 | 10/2002 |
| DE | 10 2006 006 133 A1 | 9/2006 |
| DE | 60305751 T2 | 6/2007 |
| EP | 1 331 434 B1 | 6/2006 |
| EP | 2 050 997 A1 | 4/2009 |

OTHER PUBLICATIONS

"EZ-SCREEN® Safety Light SCREENs" brochure, Banner Engineering. Minneapolis, MN: 16 pages, Sep. 2005.*
"Safety Light Curtain (Type 4) F3SJ Ver. 2", datasheet, Omron Corporation. Kyoto, Japan: 88 pages, Feb. 2007.*
"SE4B Light Curtains", brochure, IDEC Corporation. Osaka, Japan: 16 pages, Jul. 21, 2006.*
"EZ-SCREEN Safety Light SCREENs" brochure, Banner Engineering. Minneapolis, MN: 16 pages, Sep. 2005.*
German Search Report, in the corresponding Application No. DE 20 2010 008 137.8, four (4) pages.

* cited by examiner

*Primary Examiner* — George Bugg
*Assistant Examiner* — Anthony D Afrifa-Kyei
(74) *Attorney, Agent, or Firm* — Nath, Goldberg & Meyer; Jerald L. Meyer

(57) ABSTRACT

A sensor system includes at least one safety sensor unit for monitoring a safety relevant zone of a plant. The sensor system also includes a display unit connected to the sensory unit or integrated into it. The sensor system outputs a safety switch signal on an intrusion of an unpermitted object into the monitored, safety relevant zone and the safety sensor unit has an input interface for receiving a further safety switch signal. The input interface can be configured such that, on the one hand, it can receive the further safety switch signal and, on the other hand, can also receive external, non-safety relevant signals of an external device. The display unit is designed to display internal state data of the sensor system and information resulting from the external non-safety relevant signals.

7 Claims, 2 Drawing Sheets

Figure 1:
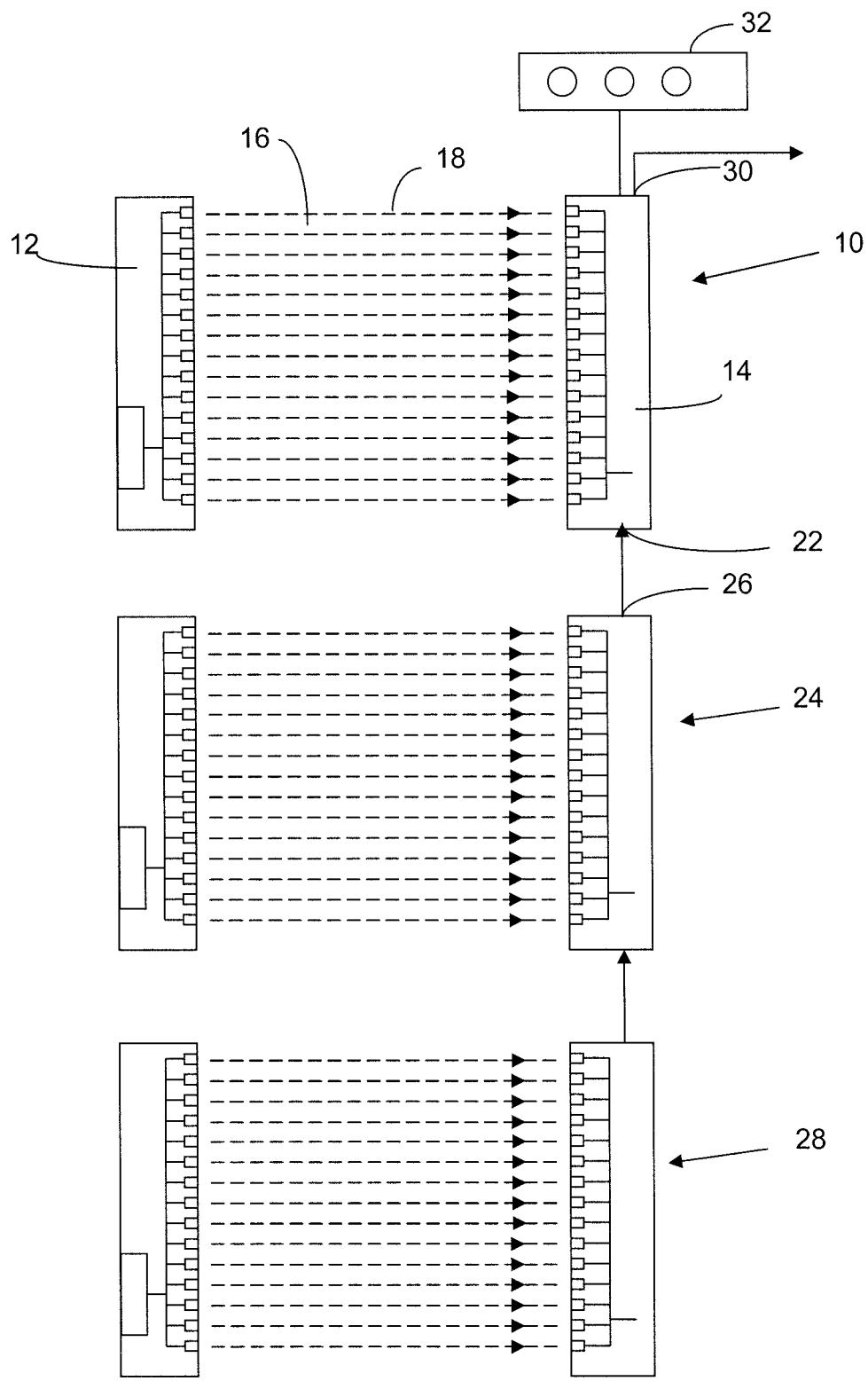

| $S_{OSSD}$ | State displayed |
|---|---|
| 0  0 | Internal state of the safety sensor 10 |
| 0  1 | State1 (e.g. green) |
| 1  0 | State 2 (e.g. flashing green/yellow) |
| 1  1 | State 3 (e.g. red) |

SENSOR SYSTEM FOR PLANT MONITORING

The invention relates to a sensor system for monitoring a plant with respect to operational security, in particular a sensor system for securing access or danger zones by means of light grids, having at least one display element for displaying a state of the sensor system of the plant connected thereto.

Systems for securing access or danger zones are in particular increasingly gaining importance with the automation of manufacturing and packaging processes. The robots which carry out the automated processes as a rule represents a substantial danger potential for human personnel so that it must be ensured that they cannot intrude into the danger zone defined by the working range of the corresponding robot without triggering a safety function, e.g. the protective shut-down of the robot.

This is achieved, for example, by the use of a light grid for monitoring the borders of the danger zone which deactivates the danger source, e.g. a plant to be monitored, e.g. in that the respective robot is shut down, when a person or another unpermitted object intrudes into the protected field generated by the light grid. The safety light grid in this respect protects against unpermitted intrusion into danger zones in that the protected field spanned by the light grid is monitored for infringement by an object. If the protected field is infringed upon, the safety light grid outputs a corresponding safety signal which can e.g. be a shut-down signal for the machine representing a danger. Such light grids as safety sensors have to work reliably and must therefore satisfy high safety demands, for example, the equipment standard EN61496 for electrosensitive protective equipment (ESPE) and, in application, the standard EN 13849 for machine safety.

Safety sensor units for producing such light barriers have—e.g. depending on whether the "protected field" defined by the light grid was interrupted by a person or an object or not—different states which should be displayed as clear as possible for reasons of safety and comfort and as obtrusively as possible for the environment. An optical display is frequently used such as signal lamps signal to traffic lights. Such states can e.g. indicate one of the following situations: "Protected field was infringed/Protected field is being infringed" (state 1); "No protected field infringement detected/Sensor unit has been reset" (state 2); and "No protected field infringement detected, but rest of the sensor unit required" (state 3). Each of these states is e.g. optically signalized, e.g. by a red signal for state 1; a green signal for state 2; and a flashing yellow/green signal for state 3, by a display unit connected to the light grid. A distention of further states and a different kind of signalizing (display) of the states is naturally also possible. Furthermore, not only light grid sensors can be considered as safety sensor units, but also laser scanners, single-beam light barriers and the like.

It is further known e.g. to cascade light grids into a sensor combination, with a plurality of lower-ranking subordinate units ("guest units" being connected in a cascade in addition to a main unit ("host" unit). Each safety sensor unit of the cascade which forms a guest unit is connected via its safety switching output (as a rule the "OSSD" output=output signal switching device) to the next safety sensor unit of the cascade. Only the safety sensor unit acting as the host unit outputs a safety switching signal via its OSSD output to external, e.g. to a machine control. So that such a cascade can be set up, each safety sensor unit has a safety input for an OSSD signal.

The object underlying the invention is to provide a sensor system having a safety sensor unit and an associated display unit which is simple to configure and can flexibly display information relating to further sensor units and/or relating to the plant to be monitored.

This object is satisfied by a sensor system in accordance with claim 1. Exemplary embodiments and further developments of the invention form the subject matter of the dependent claims.

An example of the invention relates to a sensor system having a safety sensor unit for monitoring a safety relevant zone of a plant as well as having a display unit connected to the safety sensor unit or integrated therein. In this respect, the sensor system outputs a safety shut-down signal on the intrusion of an unpermitted object into the monitored, safety relevant zone. The safety sensor unit has an input interface for receiving a further safety switch signal. In accordance with the invention, the input interface can be configured so that it, on the one hand, can receive further safety switch signals and, on the other hand, can also receive external non-safety relevant signals of an external device. The display unit is furthermore designed to display internal state data of the sensor system and information resulting from the external non-safety relevant signals.

The switch state determined by the safety sensor unit for a safety signal (Protected field infringed/Not infringed) defines an internal state of the safety sensor unit which e.g. indicates an intrusion of an unpermitted object into the monitored, safety relevant zone. This information is as a rule output as a safety switch signal (OSSD signal).

The safety sensor unit and the at least one external sensor unit connected to the safety sensor unit via the input interface can form a sensor combination. In this case, the display unit is designed to display a state which depends on the state of the at least one external sensor unit as well as on the internal state of the safety sensor unit.

The received information can be digitally encoded, whereby a finite number of different codes can be transferred to the safety sensor unit. The display unit can be designed to display the internal state of the safety sensor unit on receiving a predefined code. The reception interface can be configured so that this predefined code is applied to it if no external sensor unit is connected to the reception interface or if the monitored plant is connected to the reception interface and transmits information. The display unit can furthermore be able to be shut down in dependence on the received information. The display unit can have optical display elements for displaying a state.

In accordance with an embodiment, the safety sensor unit is designed as a light grid and is designed to signalize an infringement of the protected field of the light grid by a corresponding internal state.

The invention will be explained in more detail in the following with reference to embodiments shown in the drawings. There are shown FIGS. 1 and 2 examples of a sensor system in accordance with the invention; and FIG. 3 a table to illustrate the control of the states of the sensor units to be displayed.

In the Figures, the same reference numerals designate the same or similar components or signals having the same or a similar importance.

The structure of an exemplary sensor system is shown in FIG. 1. The sensor system includes a safety sensor unit 10 which is designed as a "host" light grid. The light grid 10 comprises a transmitter unit 12 and a receiver unit 14 which defined a protected field 16 between them which is monitored by means of light beams 18 as to whether an unpermitted intrusion and thus an interruption of the light beams 18 is taking place. A safety relevant zone of a plant 20 is thus monitored. A "guest" light grid 24 is connected via an input interface 22. The input interface 22 of the host light grid 10 is in this respect connected to the safety switch output 26 (OSSD) of the guest light grid 24. The input interface 22 can e.g. basically be any desired bus interface or a so-called OSSD input (OSSD: "output signal switching device"; cf. EN 61496-1). A further guest light grid 28 can be connected to the light grid 24 in the same way so that a cascade of these light grids form a sensor system overall. The light grid 10 is connected via its switch output 30 to the plant 20 to be monitored so that, in the event of an unpermitted intrusion into one of the protected fields, a safety switch signal can be output to the plant 20, for example for an emergency stop.

The safety sensor unit 10 is connected to a display unit 32 which could also be integrated into the safety sensor unit 10. The display unit 32 is designed so that it cannot only display the state information of the safety sensor unit 10, but also the information which is obtained via the interface 22. Various information can be displayed in this manner in a cascade, for example, as in FIG. 1. These displayable states can e.g. represent the following situations: One of the protected fields has been infringed/One of the protected fields is still being infringed" (state 1); "No protected field infringement detected/Sensor units have been reset" (state 2); and "No protected field infringement detected, but reset of the sensor units required" (state 3). Each of these states is e.g. optically signalized, e.g. by a red signal for state 1; a green signal for state 2; and a flashing yellow/green signal for state 3, by a display unit connected to the sensor unit.

The input interface 22 is therefore designed so that it cannot only accept the switch information of the further (external) sensor units, such as the named light grids 24 and 26 or of the monitored plant 20 itself, but can rather also accept other information as safety switching information as external display information. The input interface 22 of the safety sensor unit 10 can be correspondingly configured for this purpose. A plurality of information can thus be displayed at the display unit 32, for example, the internal state of the safety sensor unit 10, that is whether the protected field 16 is being infringed or not, an infringement of the protected fields of the light grids 24 and 28, information whether one of the protected fields is being infringed at all (as described in the previous paragraph) or any other state information of another device 34 connected to the interface 22. The signal transporting the display information is provided with the designation $S_{OSSD}$ in FIG. 2.

Figures 2, 3:
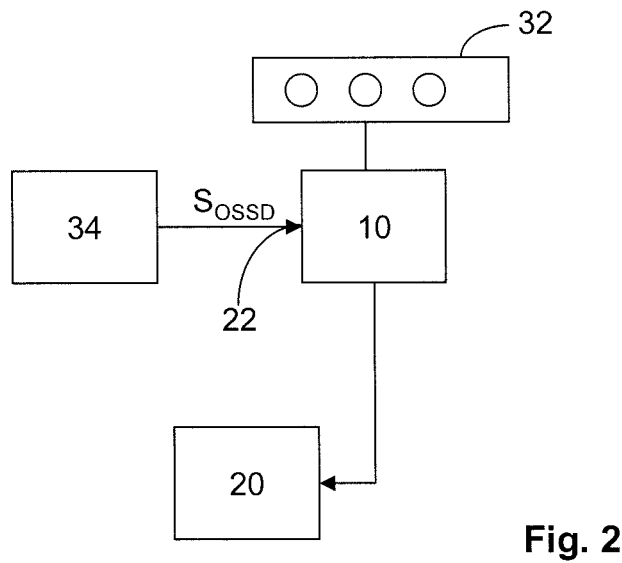

As is shown in the table of FIG. 3, the received information can be digitally encoded. In this case, a finite number of different codes can be transferred to the safety sensor unit 10. In this respect, specific codes represent different states to be displayed by the display unit 32 (e.g. the 2-bit codes "01", "10" and "11" in accordance with the table in FIG. 3). A predefined code causes the display unit 32 to display the internal state of the safety sensor unit 10. This predefined code would be the 2-bit code "00" in the example of FIG. 3. In the explained example, the digital code is a 2-bit code. Other digital word lengths as well as a serial and a parallel transmission of the codes are naturally also possible. A code which uses more than two levels is also possible in addition to a binary encoding.

In accordance with an embodiment, this predefined code is also applied to the input interface when no external sensor unit 34 or no plant control 20 is connected thereto. This is e.g. the case when the input levels of the input interface are pulled down to a lower level (corresponding to the binary value "0" via pull-down resistors and consequently the input interface sees the digital value "00" if no external sensor unit 34 is connected which actively generates a high signal level (corresponding to the binary value ("1"). This has the advantage that a system which only includes the safety sensor unit 10 is compatible with older sensor units which do not have the new function. Depending on the type of sensor unit, older sensor units can be equipped only by a change in the firmware of the sensor units having the above-described new function.

The display unit 32 can be—but does not necessarily have to be—an optical display unit 32 which represents different states of the sensor units or of the monitored plant in different colors in the manner of a traffic light (see FIG. 3). As required by the respective application, the display unit 32 can also be able to be deactivated according to the information received via the input interface, i.e. the display unit 32 is e.g. deactivated on reception of a corresponding digital code.

Sensor units were initially set forth as examples for safety sensor units which monitor the infringement of a safety zone of a plant 20 with the aid of light grids. Equally, laser scanners, camera monitoring units and the like can be used as safety sensor units.

The invention claimed is:

1. A sensor system which comprises a safety sensor unit for monitoring a safety relevant zone of a plant as well as a display unit connected to the safety sensor unit or integrated into it, wherein the sensor system outputs a safety switch signal on an intrusion of an unpermitted object into the monitored, safety relevant zone and the safety sensor unit has an input interface for receiving a further safety switch signal, wherein the input interface can be configured such that, on the one hand, it can receive the further safety switch signal and, on the other hand, can also receive external, non-safety relevant signals, of an external device and the display unit is designed to display internal state data of the sensor system and information resulting from the external non-safety relevant signals, wherein the display unit can be shut down in dependence on the received information.

2. A sensor system in accordance with claim 1, wherein the safety sensor unit and an external sensor unit connected to the safety sensor unit via the input interface form a sensor combination and the display unit is designed to display a state which depends on the switch state of the at least one external sensor unit as well as on the internal state of the safety sensor unit.

3. A sensor system in accordance with claim 1, wherein the external information is digitally encoded and a finite number of different codes can be transferred to the safety sensor unit.

4. A sensor system in accordance with claim 3, wherein the display unit is designed to display the internal state of the safety sensor unit on reception of a predefined code.

5. A sensor system in accordance with claim 3, wherein the input interface is configured such that the predefined code is applied to it if no external sensor unit is connected to the reception interface or the monitored plant is connected to the reception interface and transmits information.

6. A sensor system in accordance with claim 1, wherein the display unit includes optical display information for displaying a state.

7. A sensor system in accordance with claim 1, wherein the safety sensor unit is designed as a light grid and is designed to signalize an infringement of the protected field of the light grid by a corresponding internal state.

* * * * *